Patented July 3, 1934

1,965,042

UNITED STATES PATENT OFFICE 1,965,042

WATERPROOFING COMPOUND AND PAINT VEHICLE

William Kuckro, St. Albans, N. Y., assignor to El Glykol Waterproofing & Construction Corporation, New York, N. Y., a corporation of New York No Drawing. Application August 13, 1931, Serial No. 556,939

6 Claims. (Cl. 134—56)

My invention relates to water-proofing and preserving compounds.

The object of the present invention is the manufacture of a compound adapted for use in preserving and water-proofing such materials as stone, brick, concrete, wood, etc. and which may also serve as a base for paints and varnishes.

This application is a continuation-in-part of my copending application filed May 14, 1929, Serial No. 363,112.

My water-proofing compound is prepared from fatty oils preferably of the drying variety, for example, linseed oil, perilla oil, and China-wood oil.

In order to produce the water-proofing compound such fatty oils are subjected first to slight oxidation at elevated temperatures and then to slight chlorination at lower temperatures. The product resulting from this treatment is then dissolved in a suitable distillate or menstruum and is ready for use as a water-proofing and preserving compound.

In the practice of the process, for example, China-wood oil is first heated to a temperature of about 240°–260° C., preferably about 240°–245° C. When such temperature is attained a small amount of an oxidation catalyst such as manganese borate is stirred into the heated oil. After maintaining the mass at the desired temperature for a few minutes it is quickly cooled, preferably to a temperature of about 175° C. Great care should be taken during the heating stage to avoid too extended heating and too high temperatures in order to prevent radical polymerization and jelling or solidifying of the China-wood oil. At about this temperature a mild chlorinating agent such as carbon tetrachloride is added. The tetrachloride is preferably introduced below the surface of the oil to permit it to react therewith, inasmuch as the prevailing temperature has a strong tendency to volatilize the carbon tetrachloride and drive it away from the zone of reaction. Other chlorinating agents such as chlorine gas may also be used provided the extent of chlorination is regulated to substantially the amount obtained in the use of carbon tetrachloride. When the desired extent of chlorination has been effected, the mass is cooled and a distillate such as light petroleum distillates, turpentine and the like may be added in any desired proportion.

The following constitutes a detailed working example:

Three gallons of China-wood oil is raised to a temperature of about 240° C.; at this temperature 12 grams of manganese borate is added with rapid stirring. The temperature is maintained for a period not exceeding about fifteen minutes, but preferably from one to two minutes. In order to quickly cool the oil and also to partially dilute it, about 1 gallon of water white kerosene is added. The temperature of the mass will thus be reduced to about 175° C. and when this temperature is attained 1½ pints of carbon tetrachloride is gradually added by introducing the same preferably near the bottom of the vessel. The rate of introduction of carbon tetrachloride is such that from 1–2 minutes are required for this step of the process. When the carbon tetrachloride has been introduced and the temperature has been reduced sufficiently, for example, to about 100° C., any desired quantity of diluent such as kerosene or solvent naphtha is added.

Batches of any desired size may be prepared in accordance with the foregoing procedure provided the ingredients are employed in the relative quantities indicated, and the statement of these quantities in the claims is, therefore, intended to be without limiting effect other than to provide the relative proportions. By suitably varying the conditions of treatment the other drying oils mentioned may be converted into satisfactory water-proofing materials.

This forms a solution of water-proofing material which when applied to stone, brick, masonry and the like penetrates the pores of the same and coats the surface of the material to which it is applied, efficiently protecting it from the elements such as rain, sea water, salt water air, heat and frost. The coating is not substantially acted upon by alkalies or acids and forms a colorless water-proofing material which remains effective for many years.

While I have described manganese borate as an oxidizing catalyst and carbon tetrachloride as a chlorinating agent in the foregoing discussion, these reagents may act in other ways and other reactions may take place, and I, therefore, do not desire to be limited by my expressed theory.

I claim:

1. The process of preparing a water-proofing compound adapted to produce a substantially colorless, transparent, tough, and weather-proof penetrating film when applied to masonry, stone and the like, which comprises heating China wood oil to a temperature of the order of 240° C., maintaining such temperature for a period of not to exceed five minutes while dispersing throughout the oil a small amount of manganese borate in finely divided state, adding a diluent and reducing the temperature to about 175° C., introducing into the mass carbon tetrachloride without reducing the temperature below about 100° C., and thereafter diluting the product with a volatile solvent to produce a penetrative solution of waterproofing material.

2. The process of preparing a water-proofing compound adapted to produce a substantially colorless, transparent, tough, and weather-proof penetrating film when applied to masonry, stone and the like, which comprises heating 3 gallons of China wood oil to a temperature of the order of 240° C., quickly dispersing throughout the oil 12 grams of manganese borate in finely divided state and maintaining the temperature for not in excess of five minutes, adding 1 gallon of a diluent consisting of a light petroleum distillate and reducing the temperature to about 175° C., introducing into the mass about 1½ pints of carbon tetrachloride without reducing the temperature below about 100° C., and thereafter diluting the product with an additional amount of light petroleum distillate to produce a penetrative solution of the water-proofing material.

3. The process of preparing a water-proofing compound adapted to produce a substantially colorless, transparent, tough and weather-proof penetrating film when applied to masonry, stone and the like, which comprises heating China wood oil to about 230–250° C., maintaining such temperature for a short period of time but not sufficiently long to effect radical polymerization and jelling of the mass, dispersing throughout the oil a small amount of manganese borate in a finely divided state, cooling the mixture to about 175° C, by adding kerosene, introducing carbon tetrachloride into the mass without reducing the temperature below about 100° C., and thereafter further diluting the oil with kerosene to produce a light-colored penetrative solution of waterproofing material.

4. A water-proofing compound adapted to produce a substantially colorless, transparent, tough, and water-proof penetrating film when applied to masonry, stone and the like consisting practically of China wood oil which has been heated for a brief interval at a temperature of the order of 240° C. with a small amount of manganese borate, and thereafter and at a reduced temperature of the order of 175° C. partially chlorinated with carbon tetrachloride, and containing a volatile hydrocarbon solvent.

5. A water-proofing compound adapted to produce a substantially colorless, transparent, tough and water-proof penetrating film when applied to masonry, stone and the like consisting practically of China wood oil which has been subjected to heating for a brief interval at a temperature of the order of 240° C. in the presence of a small amount of manganese borate and thereafter and at a reduced temperature of the order of 175° C. treated with carbon tetrachloride, and containing as a solvent and diluent water white kerosene.

6. The process of water-proofing masonry, stone and the like, which comprises applying to the surface China wood oil, which has been subjected to heating for from 1–2 minutes at a temperature of the order of 240° C. in the presence of manganese borate and subsequently and at a reduced temperature of the order of 175° C. to chlorination with carbon tetrachloride, and containing a volatile hydrocarbon solvent.

WILLIAM KUCKRO.